Patented May 16, 1950

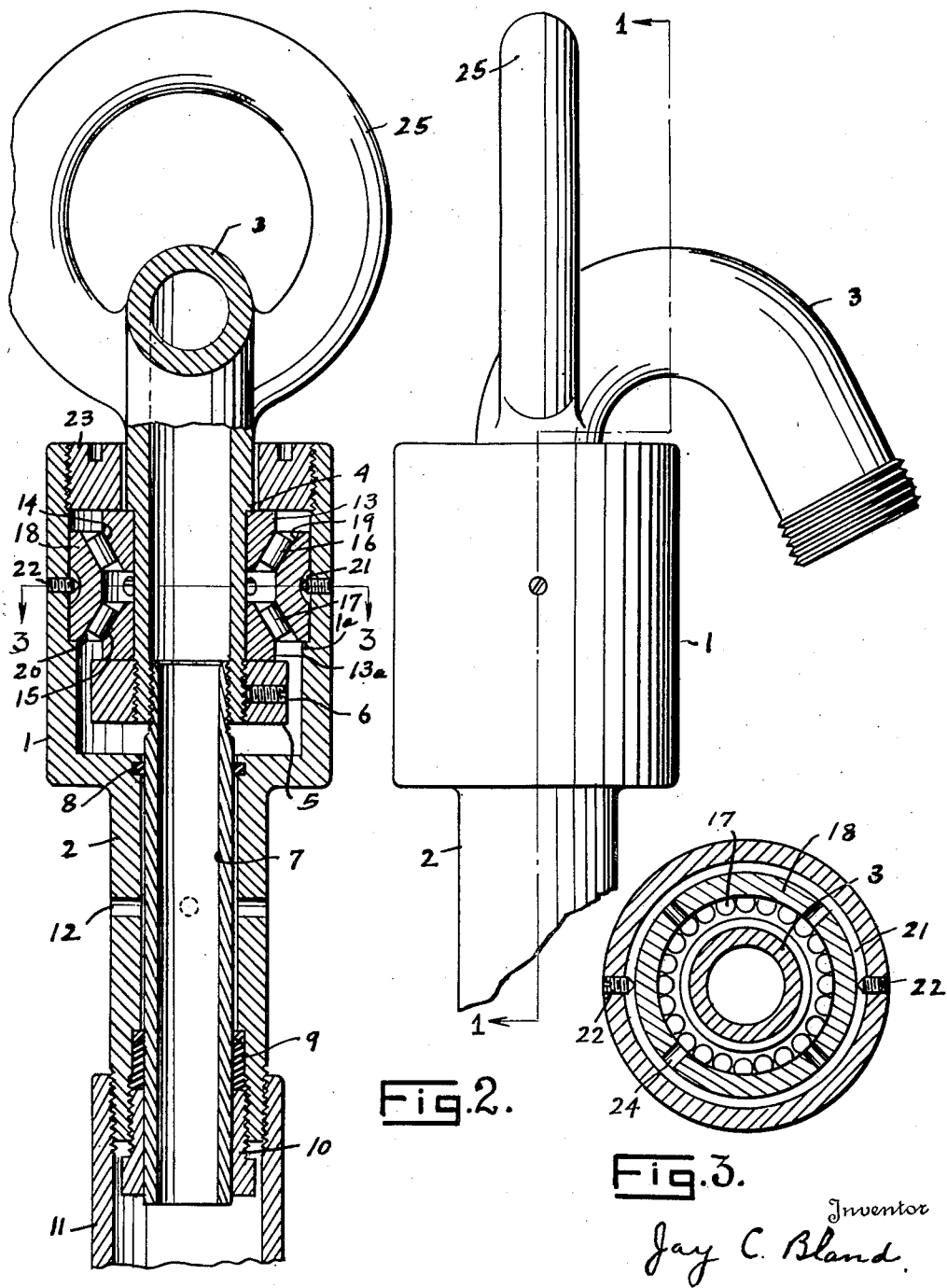

2,507,849

UNITED STATES PATENT OFFICE 2,507,849

SWIVEL

Jay C. Bland, Houston, Tex.

Application September 6, 1946, Serial No. 695,241

1 Claim. (Cl. 255—25)

This invention relates to a swivel.

An object of the invention is to provide a swivel of the character described specially designed for supporting a drill stem while the same is being used in rotary well drilling and which is provided with a hose connection, commonly designated as a "goose neck" and through which drilling fluid may be forced downwardly through the swivel and through the wash pipe into the drill stem.

Another object of the present invention is to provide a novel arrangement of a bearing assembly for supporting the weight of the drill stem from the hose connection, or "goose neck."

The invention also embodies a novel arrangement whereby accumulation may be drained from around the wash pipe.

With the above and other objects in view the invention has particular relation to certain novel features of construction, arrangement of parts, and use, an example of which is given in this specification and illustrated in the accompanying drawings, wherein:

Figure 1 is a vertical, sectional view of the swivel taken on the line 1—1 of Figure 2.

Figure 2 is a side elevation of the swivel; and

Figure 3 is a cross, sectional view taken on the line 3—3 of Figure 1.

Referring now more particularly to the drawings wherein like numerals of reference designate the same parts in each of the figures, the numeral 1 designates a tubular swivel housing depending from which there is a reduced tubular stem 2.

The numeral 3 designates an arcuate hose connection, commonly known as a "goose neck" whose outer end is externally threaded to receive the end of the drill hose which leads from the slush pump and through which drilling fluid is supplied to the drill stem.

The other end of the "goose neck" extends down axially into the housing 1 and its lower end is reduced forming an external, annular downwardly facing shoulder 4.

Screwed onto the lower end of this downwardly extended end of the goose neck there is a nut 5 which may be maintained securely in place by means of a set screw 6.

Screwed into the lower end of the "goose neck" there is the tubular wash pipe 7 which extends down through the neck 2.

A packing ring 8 is countersunk into the lower end of the housing 1 and fits closely against, and forms a seal around, the upper end of the wash pipe and within the lower end of the neck 2 around the wash pipe there is a stuffing box 9 which is maintained in place to form a seal around the lower end of the wash pipe by the gland 10.

The drill stem 11 is connected to the lower end of the neck 2.

This neck is provided with drain openings 12 for the drainage of accumulated fluid which may be collected between the neck 2 and the wash pipe 7.

Between the shoulder 4 and the nut 5 are the upper and lower raceway rings 13 and 13a which have the upper and lower inwardly converging bearing faces 14 and 15 against which the upper and lower series of roller bearings 16 and 17 ride.

Surrounding these series of roller bearings there is an outer raceway ring 18 having the upper and lower inwardly converging faces 19 and 20 which bear against the upper and lower series of rollers 16, 17. This outer raceway ring 18 has an external annular groove 21 therearound and threaded through the housing there are the set screws 22 whose inner ends engage the ring 18 to hold it against turning in the housing 1.

Screwed into the upper end of the housing and abutting the upper ring 13 there is a ring nut 23 which fits closely around the goose neck and encloses the housing 1.

This housing will normally be filled with a suitable lubricant and the lubricant may pass freely through radial openings 24, in the outer raceway ring 18 and reach the groove 21 so as to lubricate the walls of the housing between the housing and raceway ring and so as also to reach the roller bearings 16 and 17 so that all of the parts of the swivel may be lubricated. The swivel and drill stem are swung from the travelling block of the drilling rig and for that purpose the "goose neck" is provided with an eye 25 to receive the rook of the travelling block.

The raceway ring 18 is supported on the inside shoulder 1a in the housing 1 and bearing assembly hereinabove described will maintain the wash pipe 7, as well as the downwardly extended end of the "goose neck" in perfect alignment with the housing 1 and neck 2 and will prevent relative lateral movement of said parts thus minimizing wear and conducing to a long life of the swivel.

A swivel of the character above described consists of relatively few parts and therefore may be cheaply and easily constructed.

The drawings and description are illustrative merely while the broad principle of the invention will be defined by the appended claim.

What I claim is:

A swivel comprising, a swivel housing having an inside, annular, upwardly facing shoulder, a tubular neck depending from the housing, a hose connection one end of which is extended axially into the housing and about which the housing is mounted to rotate, an external, annular downwardly facing shoulder on said connection, a bearing assembly between said shoulders and around said connection and including upper and lower annular raceway rings having inwardly converging faces, said upper ring abutting the connection shoulder, an outer raceway ring resting on said inside shoulder and having inwardly converging faces, series of rollers between the corresponding faces of said inner and outer raceway rings, a ring nut threaded into the upper end of the housing and abutting said upper raceway ring, a ring nut threaded onto the end of said connection and abutting the lower raceway ring and a wash pipe within said neck and whose upper end is attached to said connection.

JAY C. BLAND.

REFERENCES CITED

The following references are of record in the file of this patent:

UNITED STATES PATENTS

| Number | Name | Date |
|---|---|---|
| 1,259,853 | Greve | Mar. 10, 1918 |
| 1,629,650 | Brauer | May 24, 1927 |
| 1,760,224 | Wray | May 27, 1930 |
| 1,820,577 | Minor | Aug. 25, 1931 |
| 2,218,473 | Minor | Oct. 15, 1940 |
| 2,434,684 | Casperson | Jan. 20, 1948 |